United States Patent [19]

Sugden

[11] Patent Number: 4,753,071
[45] Date of Patent: Jun. 28, 1988

[54] SELF-POWERED ROTATING-CYLINDER TYPE LINEAR ACTUATOR UTILIZING ROTATION-GENERATED CENTRIFUGAL HEAD FOR PISTON POSITIONING

[75] Inventor: Kenneth B. Sugden, Rockford, Ill.

[73] Assignee: Sundstrand Corporation, Rockford, Ill.

[21] Appl. No.: 812,254

[22] Filed: Dec. 23, 1985

[51] Int. Cl.⁴ ............................................... F15B 15/18
[52] U.S. Cl. ...................................... 60/475; 60/476; 91/416; 188/295; 188/313; 92/55; 92/110; 92/136
[58] Field of Search ................ 92/55, 106, 110, 136; 91/59, 416; 60/413, 473, 475, 476; 74/606 A; 415/105, 89, 90; 416/157 R; 188/290, 295, 313

[56] References Cited

U.S. PATENT DOCUMENTS

| | | | |
|---|---|---|---|
| 2,642,275 | 6/1953 | Sollinger | 415/105 |
| 2,643,555 | 6/1953 | Steibel | 60/911 X |
| 2,750,816 | 6/1956 | Mott | 91/161 X |
| 2,883,938 | 4/1959 | Shoffner | 103/218 |
| 2,986,122 | 5/1961 | Shattuck | 92/136 X |
| 3,313,215 | 4/1967 | Bieri | 92/136 X |
| 3,388,548 | 6/1968 | Vieths | 60/369 |
| 3,620,131 | 11/1971 | Nitkiewicz et al. | 92/2 |
| 3,739,693 | 6/1973 | Puster | 92/163 X |
| 3,874,183 | 4/1975 | Tabet | 74/606 A X |
| 3,892,165 | 7/1975 | Lioux | 92/106 X |
| 4,003,297 | 1/1977 | Mott | 92/163 X |
| 4,159,888 | 7/1979 | Thompson | 415/105 |
| 4,508,015 | 4/1985 | Lin | 92/2 |

FOREIGN PATENT DOCUMENTS

| | | | |
|---|---|---|---|
| 2405105 | 8/1975 | Fed. Rep. of Germany | 60/413 |
| 911726 | 11/1962 | United Kingdom | 92/106 |

Primary Examiner—Edward K. Look
Assistant Examiner—George Kapsalas
Attorney, Agent, or Firm—Wood, Dalton, Phillips, Mason & Rowe

[57] ABSTRACT

Conventional piston-cylinder hydraulic actuators require external pressure sources. The hydraulic actuator disclosed utilizes the centrifugal head developed in its chambers. The piston (36) is attached to shaft extension (24) which is splined to the actuator cylinder (20). The cylinder (20) rotates with the shaft (16) to develop a centrifugal fluid head which is selectively directed from the outlet port (40a, 40b) of a contracting chamber through a servo valve (46) to the return passageway (46b, 46a) of an expanding chamber to axially displace piston (36) and shaft (16). An accumulator in the fluid circuit retains fluid displaced from the cylinder (20).

28 Claims, 3 Drawing Sheets

SELF-POWERED ROTATING-CYLINDER TYPE LINEAR ACTUATOR UTILIZING ROTATION-GENERATED CENTRIFUGAL HEAD FOR PISTON POSITIONING

BACKGROUND OF THE INVENTION

1. Field Of The Invention

This invention relates to a hydraulic actuator and, particularly, to a hydraulic actuator for effecting bidirectional axial displacement of a shaft.

2. Description Of The Prior Art

There are certain applications wherein rotating or nonrotating shafts must be moved axially for various reasons, such as actuating switches or other actuator purposes during a particular mode of operation. For instance, rotors on a generator may be shifted angularly to control loading parameters by axial movement of a driving shaft. The axial movement of the shaft most often is effected by using a conventional hydraulic piston on one end of the shaft. Heretofore, the hydraulic fluid flow and pressure operating on the piston has been provided by a rather complex hydraulic system employing pumps, numerous valves, complex accumulators, piping/coring and like components. Such a system or structural arrangement not only is too heavy, complex and expensive for many applications, but such systems are rather inefficient.

Rotating and reciprocating systems also are used on various tool applications, such as thread tapping tools or the like. For instance, U.S. Pat. No. 3,388,548 to Bieths, dated June 18, 1968, shows a rotating and reciprocating shaft splined to a motor for rotation thereby. The rotating shaft is reciprocally movable in an axial direction relative to the motor and extends into a cylinder. The cylinder is stationary and the shaft has a piston in the form of pump means defined by a vane-type pump arrangement. Fluid communication is established through the cylinder on opposite sides of the vane pump for effecting axial movement of the shaft in response to rotation of the shaft. Such a construction also is rather complicated and involves quite a number of movable parts for constructing and assembling the vane pump-piston within the stationary cylinder.

The invention is directed to providing a new and improved hydraulic actuator of the character described above and which overcomes one or more of the above problems.

SUMMARY OF THE INVENTION

An object, therefore, of the invention is to provide a hydraulic actuator for effecting bidirectional axial displacement of a shaft, including a rotating shaft.

In the embodiment of the invention shown herein, a fluid filled, closed cylinder is coupled to a shaft for rotation therewith to develop a centrifugal fluid head within the cylinder. The shaft is axially reciprocal relative to the cylinder. A piston is fixed to the shaft within the cylinder dividing the cylinder into chambers on opposite sides of the piston. Generally, selectively operable means are provided for directing the centrifugal fluid head from one chamber to the other to move the shaft axially in a selected direction in response to rotation of the cylinder.

More particularly, the shaft is coupled to motor means for rotation thereby. The rotating shaft is reciprocally movable in an axial direction with respect to the motor and the cylinder. The cylinder is rotatably mounted within a housing having conduit means communicating between portions of the cylinder on opposite sides of the piston for by-passing fluid around the piston. Fluid directing valve means is provided in the conduit means whereby fluid is directed from one side of the piston to the other side of the piston under centrifugal force to move the shaft axially in response to rotation of the shaft and the cylinder.

Preferably, the conduit means is in communication with the cylinder chambers substantially centrally of the cylinder, generally about the shaft.

As disclosed herein, the actuator may be part of a cooling system for a generator or the like, and the conduit means is in communication with the cooling system for receiving fluid therefrom.

It should be understood that the actuator concepts herein also are applicable for axially shifting a nonrotating shaft, as will be described.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENT

Figure 1:
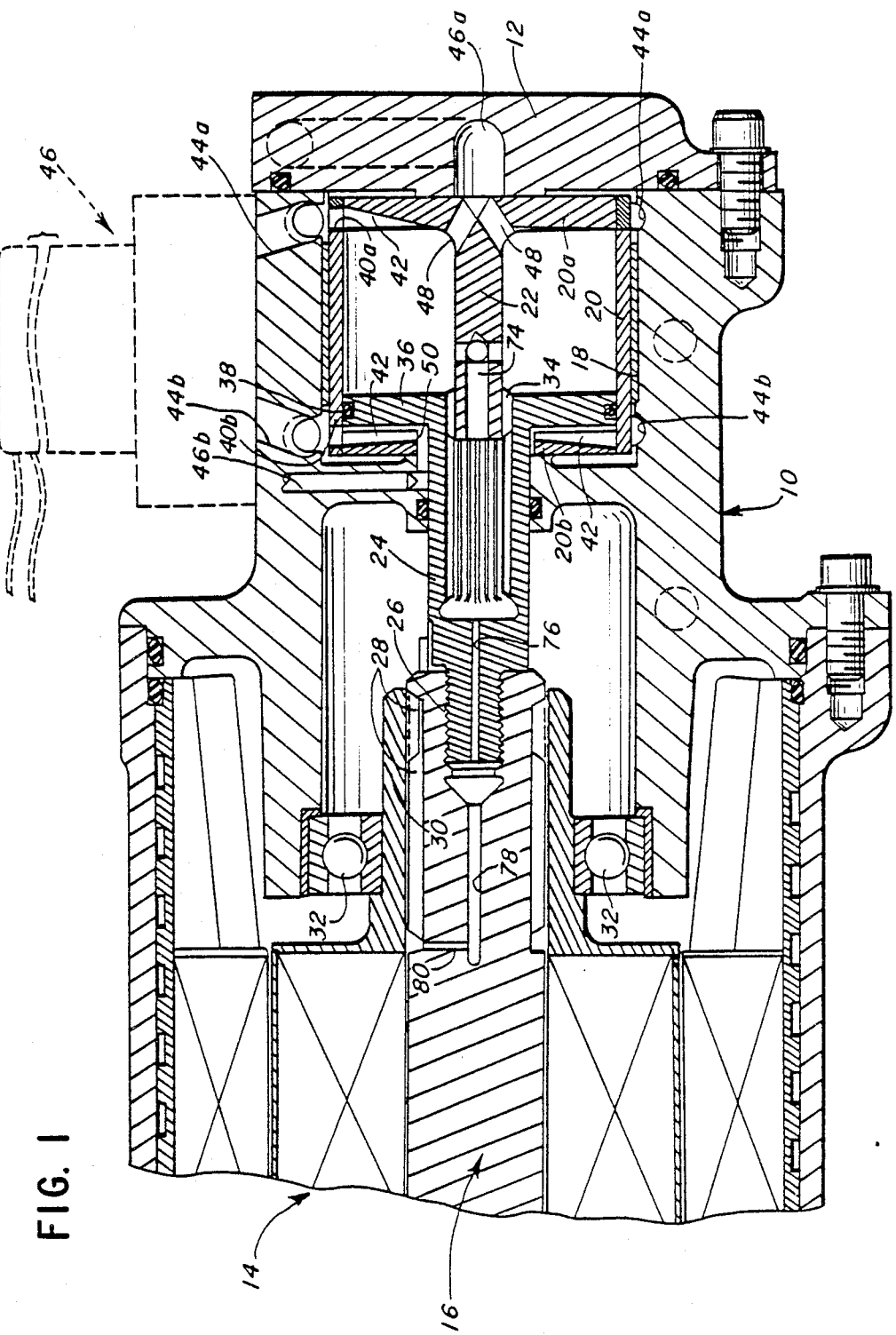
FIG. 1 is a fragmented section, axially through the hydraulic actuator of this invention, with the piston at the left-hand extreme end of its stroke.

Referring to the drawings in greater detail, and first to FIG. 1, the hydraulic actuator of this invention is shown to include a housing, generally designated 10, having an end cap 12 at one end thereof and motor means, generally designated 14, at the other end thereof. The actuator is provided for effecting bi-directional axial displacement of shaft means, generally designated 16. Housing 10 and end cap 12 define a chamber 18 within which is mounted a closed cylinder 20 which is substantially full of fluid, as described hereinafter. Cylinder 20 has opposed end walls 20a and 20b, and a guide rod 22 projects axially into the cylinder from end wall 20a.

A shaft extension 24 is threaded into the distal end of shaft means 16, as at 26, for axial and rotational movement as an integral part of the shaft means. Shaft means 16 is splined, as at 28, to a motor drive portion 30 journalled within bearings 32 within housing 10.

In turn, shaft extension 24 is splined, as at 34, to guide rod 22 of cylinder 20 for rotating the cylinder.

A piston 36 is formed integrally with shaft extension 24 within cylinder 20. As will be understood hereinafter, piston 36 divides cylinder 20 into chambers on opposite sides of the piston. An O-ring seal 38 about piston 36 prevents leakage between the chambers.

From the above, it can be seen that motor drive means 30, shaft means 16, shaft extension 24, piston 36 and cylinder 20 all rotate conjointly. However, shaft means 16, shaft extension 24 and piston 36 are movable axially relative to motor drive means 30 and cylinder 20.

Conduit means are provided for communicating fluid between portions of cylinder 20 on opposite sides of piston 36 for by-passing fluid around the piston. More particularly, outlets 40a and 40b are provided through the side wall of cylinder 20. Interior grooves 42 are formed in end walls 20a,20b of the cylinder in line with outlets 40a,40b to permit full strokes for piston 36. Fluid passageways 44a and 44b through housing 10 are provided in line, respectively, with outlets 40a and 40b. Passageways 44a,44b terminate inwardly in 360° annular portions about chamber 18 so as to be in constant communication with outlets 44a,44b. The passageways are in communication with a flow control arrangement, generally designated 46 and described hereafter in relation to FIG. 3. It can be seen that outlet 40a and passageway 44a are in communication with the interior of cylinder 20 on the right-hand side of piston 36. Likewise, outlet 40b and passageway 44b are in communication with the interior of the cylinder on the left-hand side of piston 36.

Figure 3:
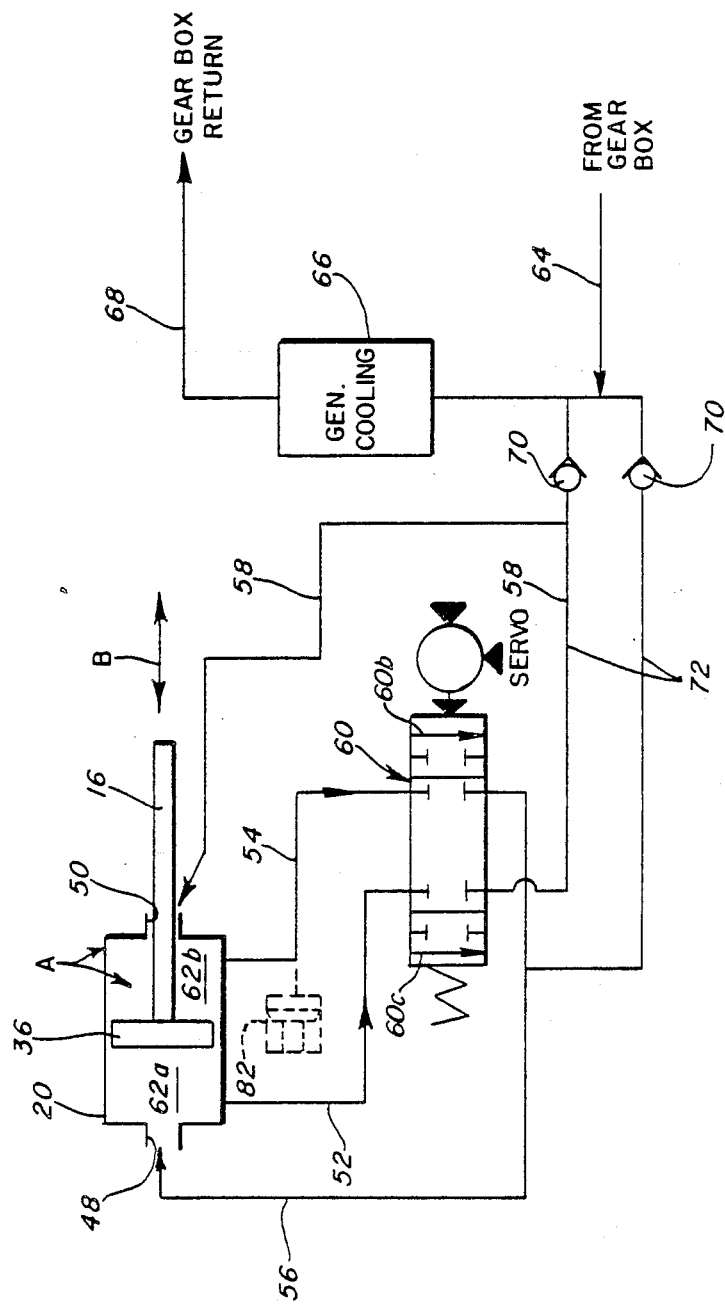
FIG. 3 is a somewhat schematic diagram illustrating the use of the actuator in a cooling system for a generator.

Before proceeding to the circuit arrangement of FIG. 3, it should be understood that, upon rotation of cylinder 20, a centrifugal fluid head is developed within the cylinder and causes the fluid to be biased radially outwardly under centrifugal action. For instance, should piston 36 be at its left-hand extreme position as illustrated in FIG. 1, centrifugal force would tend to urge the fluid outwardly through outlet 40a and passageway 44a. By directing that fluid through a closed circuit back to the cylinder on the opposite or left-hand side of the piston at the center of the cylinder, the fluid then would move piston 36 to the right as viewed in FIG. 1. Since the least centrifugal pressure is located closer to the axis of rotation, by returning the fluid back to the cylinder toward the center of the axis of rotation, the piston can be moved completely to the opposite end of its stroke.

To this end, return passageways 46a and 46b are formed through housing 10. Return passageway 46a communicates with internal passages 48 through end wall 20a of cylinder 20. It can be seen that passages 48 are located at the axially inward bounds of the cylinder chamber. Return passageway 46b communicates with a passage 50 through end wall 20b. Again, passage 50 is at the innermost radial bounds of the cylinder chamber on the left-hand side of piston 30.

Figure 2:
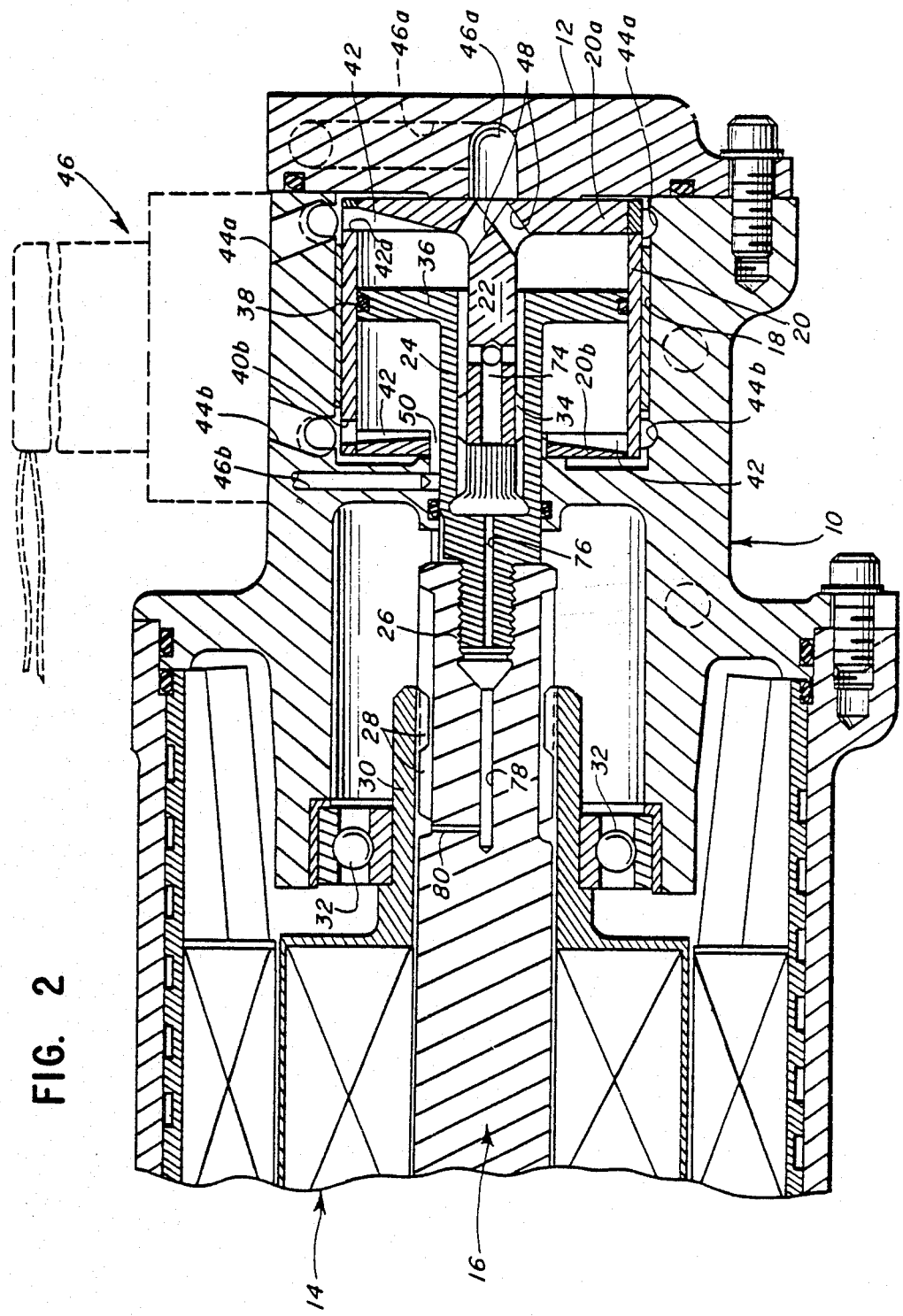
FIG. 2 is a view similar to that of FIG. 1, with the piston moved substantially toward the opposite or right-hand end of its stroke.

FIG. 2 shows piston 36 having been moved to the right under the influence of the centrifugal fluid head moving out of the cylinder 20 through outlet 40a, through passageway 44a and back into the cylinder on the left-hand side of piston 36 through return passageway 46b and passage 50.

Fluid directing means are provided in the conduit system whereby the fluid is selectively directed from one side of piston 36 to the other side of the piston under the influence of the centrifugal fluid head developed in cylinder 20. In other words, the centrifugal fluid head is selectively directed from one chamber to the other on opposite sides of the piston to move shaft means 16 axially in a selected direction in response to rotation of cylinder 20.

More particularly, referring to FIG. 3, shaft means 16, piston 36 and cylinder 20 are shown somewhat schematically and the entire assembly is rotatable as indicated by arrow "A". A line 52 represents fluid flow outwardly from cylinder 20 through outlet 40a and passageway 44 described in relation to FIG. 1. Line 54 represents fluid flow outwardly through outlet 40b and passageway 44b. Line 56 represents fluid flow back through return passageway 46a and passages 48. Line 58 represents fluid flow back through return passageway 46b and passage 50. Each of fluid flow lines 52–58 are connected to a selectively operable, fluid directing servo-valve, generally designated 60. For instance, if the valve is moved to the right as viewed in FIG. 3, valve passage 60a will connect fluid flow lines 52 and 58 to direct the centrifugal fluid head from cylinder chamber 62a on one side of piston 36 back into cylinder chamber 62b on the opposite side of the piston. Similarly, if valve 60 is moved in the opposite direction, valve conduit 60b will connect fluid flow lines 54 and 56 to direct the centrifugal fluid head outwardly from cylinder chamber 62b and back into cylinder chamber 62a. Therefore, it can be seen that rotation of cylinder 20 in the direction of arrow "A" will reciprocate shaft means 60 in the direction of double-headed arrow "B" depending upon the position of valve 60.

FIG. 3 also shows the hydraulic actuator of the invention as used in a cooling system, such as a cooling system for a generator or the like. In other words, fluid would flow from a gear box through a fluid flow line 64, through a cooling apparatus 66 and back through flow line 68. These lines may be coupled through check valves 70 and lines 72 into the flow circuit of the actuator. To this end, referring back to FIG. 1, a flow circuit could be defined by passages 74,76,78 and 80 back into the general cooling system. It also should be pointed out that since the only possible leakage routes out of the actuator are at or close to the center line of the piston where centrifugal pressure is the least, the actuator can be made to actuate during periods of main supply oil flow interruptions once cylinder 20 is full of fluid.

It can be seen that rod 22 on the right-hand side of piston 36 as viewed in FIG. 1 is of a smaller diameter than shaft extension 24. Therefore, the volume exchange from opposite sides of the piston is not equal. Consequently, an accumulator 82 (FIG. 3) is provided in the circuit in communication with the smaller dimensional side of the piston (i.e. flow line 54) to compensate for the difference in volume exchange. The accumulator is shown in dotted lines as optional because the actuator could be designed for equal volume exchange.

It should be understood that the centrifugal hydraulic actuator disclosed herein is quite applicable for a non-rotating shaft. For instance, referring back to FIG. 1, motor drive 30 could be extended and be connected directly to closed cylinder 20 for rotating the same to create the centrifugal action described above. Shaft means 16 (and shaft extension 24) would remain coupled to piston 36 for axial movement therewith relative to drive 30. Of course, such a non-rotating shaft could operably extend through the opposite end of cylinder 20 (i.e. end wall 20a) and housing 12.

It will be understood that the invention may be embodied in other specific forms with out departing from the spirit or central characteristics thereof. The present examples and embodiments, therefore, are to be considered in all respects as illustrative and not restrictive, and the invention is not to be limited to the details given herein.

I claim:

1. A hydraulic actuator providing for axial movement of shaft means, comprising:
   motor means;
   closed cylinder means at least partially filled with fluid;
   rotating shaft means extending into the closed cylinder means and coupled to the motor means for rotation thereby, the rotating shaft means being reciprocally movable in an axial direction with respect to the motor means and the cylinder means, and the cylinder means being coupled to the shaft means for rotation therewith;
   piston means fixed to the rotating shaft means within the cylinder means;
   conduit means communicating between portions of the cylinder means on opposite sides of the piston means for by-passing fluid around the piston means; and
   fluid directing means in the conduit means whereby fluid is directed from one side of the piston means to the other side of the piston means under centrifugal force to move the shaft means axially in response to rotation of the shaft means and the cylinder means.

2. The hydraulic actuator of claim 1 wherein said fluid directing means comprises selectively operable valve means in the conduit means for determining the direction of fluid flow and thereby the direction of axial movement of the shaft means.

3. The hydraulic actuator of claim 1 wherein the conduit means is in communication with generally central portions of the cylinder means generally about the shaft means.

4. The hydraulic actuator of claim 1, including housing means within which the cylinder means is rotatably mounted, with the conduit means extending at least in part through the housing means.

5. The hydraulic actuator of claim 4 wherein the conduit means is in communication with generally central portions of the cylinder means generally about the shaft means.

6. The hydraulic actuator of claim 1, including accumulator means in the conduit means.

7. The hydraulic actuator of claim 1 wherein the actuator is part of a cooling system for a generator or the like, and wherein the conduit means is in communication with the cooling system for receiving fluid therefrom.

8. The hydraulic actuator of claim 1 wherein the shaft means is splined to the motor means for rotation thereby and for axial movement relative thereto.

9. The hydraulic actuator of claim 8 wherein the piston means is formed integral with a portion of the shaft means.

10. The hydraulic actuator of claim 1 wherein interior of the end walls of the cylinder means are grooved and in line with the conduit means to permit full strokes for the piston means.

11. A hydraulic actuator for effecting bidirectional axial displacement of a shaft, comprising:
    a closed cylinder at least partially filled with fluid and coupled to the shaft for rotation therewith to develop a centrifugal fluid head therewithin, the shaft being axially reciprocal relative to the cylinder;
    a piston fixed to the shaft within the cylinder dividing the cylinder into chambers on opposite sides of the piston; and
    selectively operable means for directing the centrifugal fluid head from one chamber to the other to move the shaft axially in a selected direction in response to rotation of the cylinder.

12. The hydraulic actuator of claim 11 wherein said selectively operable means include closed conduit means between opposite sides of the piston.

13. The hydraulic actuator of claim 12 wherein said conduit means is in communication with generally central portions of the cylinder generally about the shaft.

14. The hydraulic actuator of claim 12, including selectively operable valve means in the conduit means for determining the direction of fluid flow and thereby the direction of axial movement of the shaft.

15. The hydraulic actuator of claim 12, including housing means within which the cylinder is rotatably mounted, with the conduit means extending at least in part through the housing means.

16. The hydraulic actuator of claim 15 wherein said conduit means is in communication with generally central portions of the cylinder generally about the shaft.

17. The hydraulic actuator of claim 12 wherein interior end walls of the cylinder are grooved and in line with the conduit means to permit full strokes for the piston.

18. The hydraulic actuator of claim 11 wherein the piston is formed integral with the shaft.

19. The hydraulic actuator of claim 11 wherein the actuator is part pf a cooling system for a generator or the like, and including conduit means in communication with the cooling system for receiving fluid therefrom, the conduit means communicating between said chambers.

20. A hydraulic actuator for effecting bidirectional axial displacement of a shaft, comprising:
    a closed cylinder at least partially filled with fluid;
    drive means for rotating the cylinder to develop a centrifugal fluid head therewithin;
    piston means fixed to said shaft within the cylinder and dividing the cylinder into chambers on opposite sides of the piston means; and
    selectively operable means for directing the centrifugal fluid head from one chamber to the other to move the shaft axially in a selected direction in response to rotation of the cylinder.

21. The hydraulic actuator of claim 20 wherein said selectively operable means include closed conduit means between opposite sides of the piston means.

22. The hydraulic actuator of claim 21 wherein said conduit means is in communication with generally central portions of the cylinder generally about the shaft.

23. The hydraulic actuator of claim 21, including selectively operable valve means in the conduit means for determining the direction of fluid flow and thereby the direction of axial movement of the shaft.

24. The hydraulic actuator of claim 21, including housing means within which the cylinder is rotatably mounted, with the conduit means extending at least in part through the housing means.

25. The hydraulic actuator of claim 24 wherein said conduit means is in communication with generally central portions of the cylinder generally about the shaft.

26. The hydraulic actuator of claim 21 wherein interior end walls of the cylinder are grooved and in line with the conduit means to permit full strokes for the piston means.

27. The hydraulic actuator of claim 20 wherein, the piston means is formed integral with the shaft.

28. The hydraulic actuator of claim 20 wherein the actuator is part of a cooling system for a generator or the like, and including conduit means in communication with the cooling system for receiving fluid therefrom, the conduit means communicating between said chambers.

* * * * *